Figure 1:
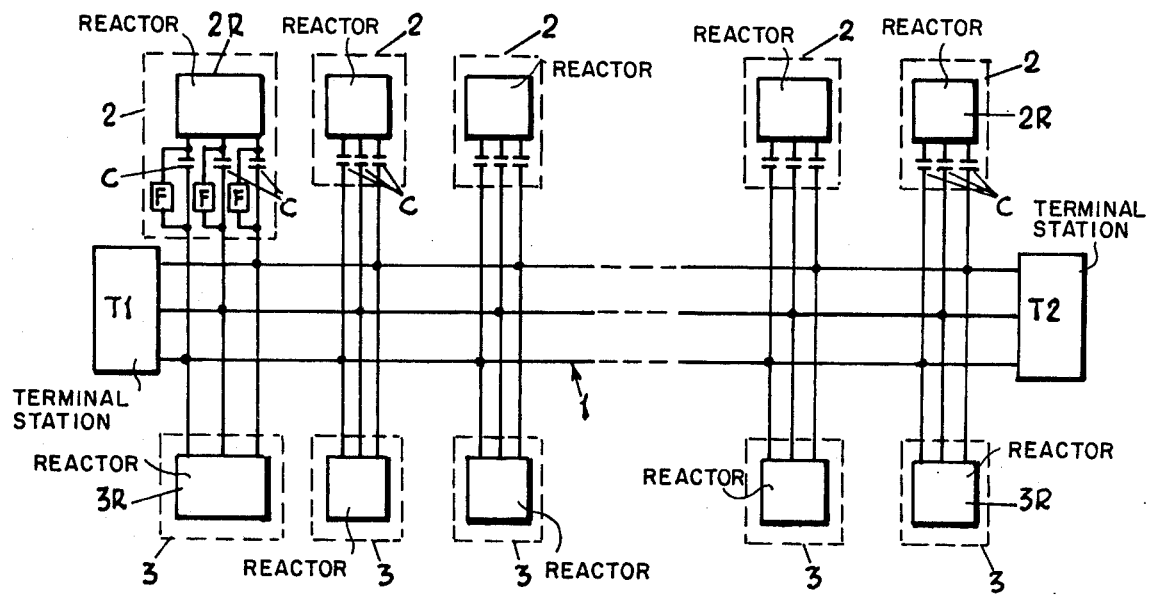

United States Patent [19]

Friedlander

[11] 4,017,790

[45] Apr. 12, 1977

[54] ALTERNATING CURRENT POWER TRANSMISSION SYSTEMS

[75] Inventor: Erich Siegfried Friedlander, Sutton Coldfield, England

[73] Assignee: Associated Electrical Industries Limited, London, England

[22] Filed: Oct. 14, 1975

[21] Appl. No.: 621,822

[30] Foreign Application Priority Data

Oct. 15, 1974 United Kingdom ............ 44603/74

[52] U.S. Cl. .................. 323/110; 307/102; 323/124
[51] Int. Cl.² .......................................... H02J 3/12
[58] Field of Search ............... 307/100, 102, 103; 323/60, 61, 101, 110, 120, 122, 124, 125, 126, 127

[56] References Cited

UNITED STATES PATENTS

| 3,139,577 | 6/1964 | Krezek | 323/124 X |
| 3,450,981 | 6/1969 | Fletcher et al. | 323/60 |
| 3,544,885 | 12/1970 | Friedlander et al. | 323/61 |
| 3,842,342 | 10/1974 | Friedlander et al. | 323/124 |
| 3,881,137 | 4/1975 | Thanawala | 323/124 X |

OTHER PUBLICATIONS

Friedlander, "Static Network Stabilization", G.E.C. Journal, vol. 33, No. 2, 1966, pp. 58–65.

Primary Examiner—A. D. Pellinen
Attorney, Agent, or Firm—Kirschstein, Kirschstein, Ottinger & Frank

[57] ABSTRACT

An alternating current power transmission system employing a long transmission line has a stabilizing arrangement comprising a plurality of alternating current saturated reactors connected to intermediate stations along its length, at least some of the reactors having slope correction capacitors in series therewith, and others of the reactors having slope reactances which are not connected by series slope correction capacitors. Since the uncompensated reactors have a substantially instantaneous transient response the stabilizing arrangement gives an overall voltage control which is better than one incorporating only slope corrected reactors.

11 Claims, 3 Drawing Figures

ALTERNATING CURRENT POWER TRANSMISSION SYSTEMS

This invention relates to alternating current power transmission systems employing transmission lines, and especially to such power transmission systems incorporating automatic voltage stabilising arrangements.

It is known to provide a degree of voltage stabilisation for an alternating current power transmission line by connecting a plurality of alternating current saturated reactors to the line at intermediate stations along its length, possibly together with boosting capacitors connected in shunt with the reactors to compensate for the excess reactive power absorption in the line impedance, when the transmitted power is higher than the surge impedance power of a given line.

Saturated reactors incorporating means for suppressing certain internally generated harmonics over the operating range of reactor currents have provided particularly advantageous for this purpose, reactors of this form being described, for example, in U.K. patent specification No. 1123582.

It has also been proposed to connect capacitors in series with such reactors employed for voltage stabilisation in order to compensate for the residual slop reactance of the reactors, which capacitors may also by associated with suitable damping by-pass filters to prevent self excitation of unwanted frequencies. While such series slope correction capacitors, as they may be referred to, can be chosen to give a substantially ideal constant voltage characteristic under normal steady state operating conditions, the cancellation of the residual reactance by an equal amount of series capacitive reactance has been found to introduce some time delays in the response of the circuit to transient changes or perturbations.

This response delay is reduced to some extent by the provision of the above-mentioned by-pass damping filters, and is adequate for many applications, even for rapidly fluctuating load and for alternating current transmission lines of up to several hundred miles. But for distance approaching a fifth to a quarter of the wave length of the alternating current system frequency wave, and for longer distances, the response delay can result in a limit to the amount of power which can be transmitted stably.

According, therefore, to the present invention, in an alternating current power transmission system including a transmission line together with a stabilising arrangement comprising a plurality of alternating current saturated reactors connected to the line at intermediate stations along its length, at least some of said reactors have slope correction capacitors connected in series therewith, and others of said reactors have slop reactances which are not compensated by series slop correction capacitors.

The uncompensated reactors have a substantially instantaneous transient response, and because of this the combined stabiliser arrangement has been found to provide adequate speed of response together with voltage constancy giving a form of overall response which is suitable for adequate voltage control along even very long transmission lines.

Individual slop corrected stabilisers (that is to say those comprising reactors having slope correction capacitors connected in series therewith) may in some cases be connected to the same points on the transmission line as the stabilisers formed by uncompensated reactors, although preferably the two forms of stabilisers are spaced along the length of the line.

Thus slope corrected and uncompensated stabilisers may alternate at suitable intervals along part or the whole of the length of the line, although many different arrangements of the two forms of stabilisers can alternatively be employed, to give the most satisfactory form of overall voltage stabilisation for any particular form of transmission line system. The optimum spacing between successive stabilisers is also a matter of calculation dependent upon the parameters of the line and the terminal stations, and may typically be in the range 150 to 200 miles.

Shunt connected boosting capacitors may be connected as required to some or all of the intermediate stations to which the two different forms of stabilisers are connected, or even at some other locations of the transmission line.

Some of the slope-corrected and/or the uncompensated stabilisers may have rotating synchronous condensers and/or rotating induction motors connected in parallel with them at the respective stations, depending upon the requirements of the transmission line system, and for some application some stabilisers may be replaced entirely by such condensers or motors.

Saturated reactors of either the slope corrected or uncompensated form of stabiliser may be connected to a relatively lower voltage winding of a step down transformer having a primary winding connected to the high voltage transmission line, or alternatively the reactors may be of the type having winding configurations capable of being connected directly to the high voltage transmission line.

Preferably each stabiliser reactor comprises a group of primary alternating current saturated reactor cores carrying either primary windings wound as for magnetic frequency multiplication, and having secondary windings arranged in the form of a closed polyphase mesh with a saturated compensating reactor connected into the mesh as described in U.K. patent specification No. 1123582 or carrying plain primary windings in star connection and having secondary flux shifting windings as described in U.K. patent specification No. 1194151.

Figure 2:
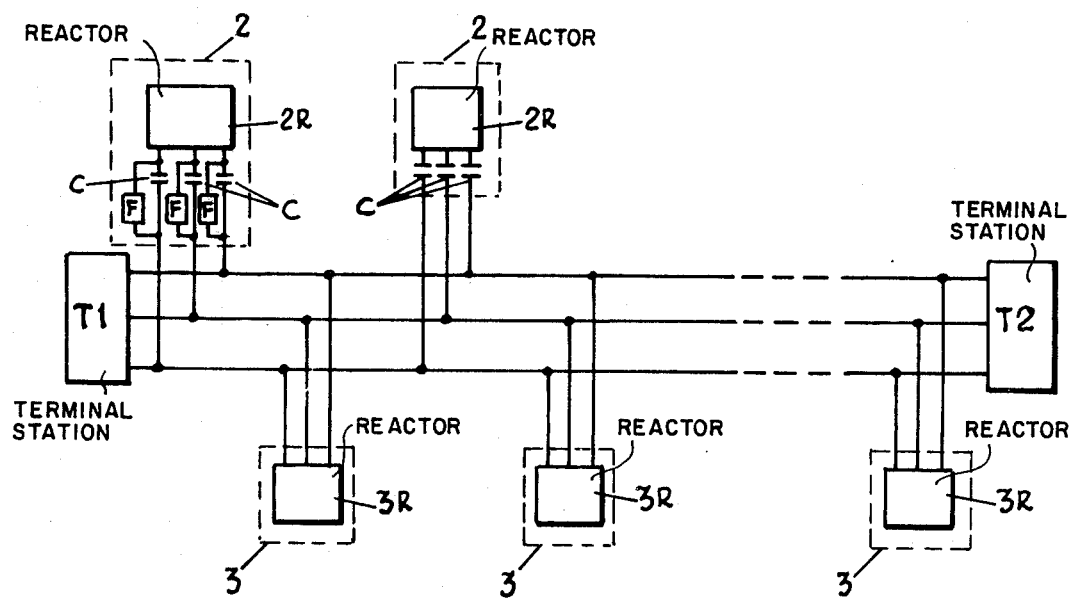
Figure 3:
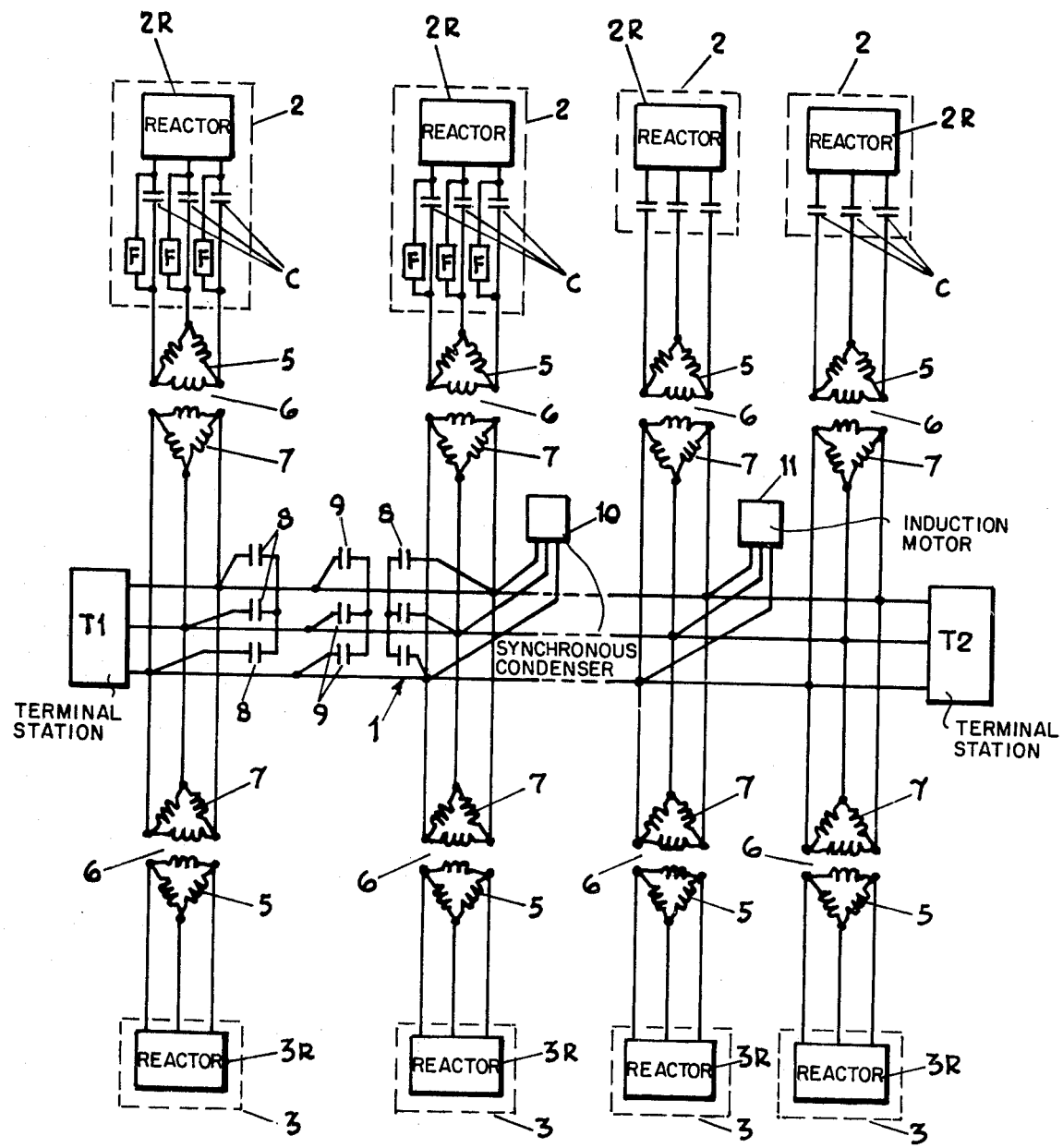

The invention will now be described, by way of example, with reference to the accompanying diagrammatic drawings in which:

FIGS. 1 and 2 show two different embodiments of the invention in which the saturated reactor stabilisers are connected directly to the transmission line; and FIG. 3 shows another embodiment of the invention in which the saturated reactor stabilisers are connected to a relatively lower voltage winding of a step-down transformer having a primary winding connected to the transmission line.

Referring first to FIG. 1 of the drawings, there is shown a three phase alternating current power transmission line 1 connected between two terminal stations T1 and T2.

Saturated reactor stabilisers shown diagrammatically at 2 and 3 are connected to the transmission line at intermediate stations along its length. Each of the stabilisers 2,3 comprises a saturated reactor 2R,3R respectively which could, for example, be in the form of one of the primary saturated reactors described in U.K. patent specifications No. 1123582 or 1194151. The stabilisers 2,3 are connected to the various intermediate stations in pairs as shown, the reactors 2R of the stabilisers 2 being usually connected through high voltage transformers (not shown) and having in series with them slope correcting capacitors C for controlling the voltage change required to produce a given change of reactive current so as effectively to eliminate the residual slope reactance including the leakage reactance of any high voltage transformers, by-pass filters for damping out unwanted frequencies, and which can be as described in U.K. patent specification No. 1176415, also being provided across the capacitors C, as at F (only some being shown). The reactors 3R of the stabilisers 3, on the other hand, are not provided with series slope correcting capacitors. A low total slope reactance for these stabilisers is helpful and therefore reactors of the type described in U.K. patent specification No. 1194151 may be preferably for stabilisers 3. It has been found that such a combination of stabilisers gives adequate voltage control with a suitably fast response time for providing satisfactory voltage stability even over very long transmission lines. Shunt connected boosting capacitors (not shown) may also be provided if required either at the stations to which the stabilisers are connected or at other points along the transmssion line.

In another embodiment illustrated in FIG. 2 the stabilisers 2,3 incorporating the slope corrected and uncompensated reactors 2R,3R respectively, are arranged alternately along the transmission line 1 as shown, such an arrangement also giving good voltage and power stability over very long transmission lines, whereby broadly stabilisers 2 ensure the voltage — and stabilisers 3 the power — stability.

However it is not necessary for the two different forms of stabilisers to be disposed in either of the ways illustrated and other arrangements of the stabilisers may be employed, to suit the particular transmission line involved, the particular arrangement chosen and the optimum spacing between stabilisers being a matter of calculation depending upon the parameters of the line and terminal stations.

In an embodiment of the invention illustrated in FIG. 3 each of the stabilisers 2,3 comprises a saturated reactor 2R,3R connected to a relatively lower voltage winding 5 of a step-down transformer 6 having a primary winding 7 connected to the high voltage transmission line 1. The reactors 2R of the stabilisers 2 have slope correcting capacitors C connected in series therewith, by-pass filters F for damping out unwanted frequencies being provided across the slope correcting capacitors C.

Shunt connected boosting capacitors 8 are connected to some of the intermediate stations at which the stabilisers are connected and other shunt connected boosting capacitors 9 are connected to the transmission line 1 at locations other than the intermediate stations. Some of the slope-corrected stabilisers 2 and/or the uncompensated stabilisers 3 have rotating synchronous condensers 10 connected in parallel therewith at the intermediate stations. Rotating induction motors 11 are also connected in parallel with the stabilisers 2 and/or the uncompensated stabilisers 3 at the intermediate stations.

The shunt connected boosting capacitors 8 and 9, the rotating synchronous condensers 10 and the rotating induction motors 11 can also be incorporated in the embodiments of the invention illustrated in FIGS. 1 and 2.

I claim:

1. An alternating current power transmission system including:
    a. a transmission line connected between a pair of mutually distant terminal stations;
    b. a plurality of intermediate stations located at spaced positions along the length of the transmission line between the terminal stations;
    c. a stabilising arrangement comprising a plurality of alternating current saturated reactors connected to the line at the intermediate stations;
    d. at least some of said reactors having slope correction capacitors connected in series therewith; and
    e. others of said reactors having slope reactances which are not compensated by series slope correction capacitors.

2. A power transmission system as claimed in claim 1, wherein the reactors having slope correction capacitors connected in series therewith and the reactors having slope reactances which are not compensated by series slope correction capacitors are connected to the same intermediate stations on the transmission line.

3. A power transmission system as claimed in claim 1, wherein the reactors having slope correction capacitors connected in series therewith and the reactors having slope reactances which are not compensated by series slope correction capacitors are connected to different intermediate stations spaced apart along the length of the transmission line.

4. A power transmission system as claimed in claim 1, wherein the intermediate station associated with reactors having slope correction capacitors connected in series therewith, and those associated with reactors having slope reactances which are not compensated by series slope correction capacitors, alternate at intervals along at least part of the length of the transmission line.

5. A power transmission system as claimed in claim 1, wherein shunt connected boosting capacitors are connected to the transmission line at some or all of the intermediate stations at which the reactors are connected.

6. A power transmission system as claimed in claim 1, wherein shunt connected boosting capacitors are connected to the transmission line at locations other than the intermediate stations at which the reactors are connected.

7. A power transmission system as claimed in claim 1, wherein at least some of the slope-corrected reactors and/or the uncompensated reactors have rotating synchronous condensers connected in parallel with them at the respective stations.

8. A power transmission system as claimed in claim 1, wherein at least some of the slope-corrected reactors and/or the uncompensated reactors have rotating induction motors connected in parallel with them at the respective stations.

9. A power transmission system as claimed in claim 1, wherein the slope-corrected reactors and/or the uncompensated reactors are connected to a relatively low voltage winding of a step down transformer having a primary winding connected to the transmission line.

10. A power transmission system as claimed in claim 1, wherein the slope-corrected reactors and/or the uncompensated reactors have winding configuration connected directly to the transmission line.

11. A power transmission system as claimed in claim 1, wherein by-pass filters for damping out unwanted frequencies are connected in parallel with at least some of the slope correction capacitors.

* * * * *